United States Patent [19]

Binnig et al.

[11] Patent Number: 4,512,811
[45] Date of Patent: Apr. 23, 1985

[54] METHOD AND APPARATUS FOR CLEANING CONTAINERS

[75] Inventors: Rupert Binnig, Mainz-Bretzenheim; Günter Gerlach, Hochheim; Peter Nilles; Jürgen Pankatz, both of Bad Kreuznach, all of Fed. Rep. of Germany

[73] Assignee: SEITZ ENZINGER NOLL Maschinenbau Aktiengesellschaft, Mannheim, Fed. Rep. of Germany

[21] Appl. No.: 470,265

[22] Filed: Feb. 28, 1983

[30] Foreign Application Priority Data

Mar. 1, 1982 [DE] Fed. Rep. of Germany ....... 3207225

[51] Int. Cl.³ .............................................. B08B 9/08
[52] U.S. Cl. ..................................... 134/10; 134/25.4; 134/26; 134/60; 134/107; 134/108; 134/111
[58] Field of Search ................... 134/10, 25.4, 26, 32, 134/60, 105, 107, 108, 111

[56] References Cited

U.S. PATENT DOCUMENTS

| 4,154,624 | 5/1979 | Wahl et al. ........................ 134/60 X |
| 4,185,647 | 1/1980 | Babunovic ........................... 134/60 |
| 4,333,485 | 6/1982 | Karlsson et al. ................. 134/111 X |

FOREIGN PATENT DOCUMENTS

| 1153281 | 8/1963 | Fed. Rep. of Germany ........ 134/60 |
| 115564 | 8/1979 | Japan .................................... 134/60 |
| 2928780 | 7/1965 | Netherlands ........................ 134/60 |

Primary Examiner—Marc L. Caroff
Attorney, Agent, or Firm—Becker & Becker, Inc.

[57] ABSTRACT

A method and container cleaning machine for reducing the harmful materials which pass into the waste water from a bottle cleaning machine which includes a preliminary soaking tank, a subsequently arranged soaking and washing solution bath which includes at least one bath, and spraying sections which are arranged after the soaking and washing solution bath. Soaking solution is used as the bath solution for the preliminary soaking tank. At least a partial flow of the soaking solution is removed from the preliminary soaking tank, is cleaned, and is returned to a soaking bath of comparable wash solution concentration for further bottle handling while observing the bath solution levels which are to be maintained and while observing a sufficient wash solution regeneration. The used spray water from the spraying sections is withdrawn from the container cleaning machine while bypassing the preliminary soaking tank. Solution is alternately withdrawn from the preliminary soaking tank and the subsequently arranged bath and fed to a common wash solution cleaning device, then recycled to the respective tank or bath from which it originated.

17 Claims, 2 Drawing Figures

METHOD AND APPARATUS FOR CLEANING CONTAINERS

BACKGROUND OF THE INVENTION

The present invention relates to a method of reducing the quantity of harmful material which passes into the waste water from a container cleaning machine which comprises a preliminary soaking tank, a subsequently arranged soaking and washing solution bath which includes at least one bath, and spraying sections which are arranged downstream or after the soaking and washing solution bath. The present invention also relates to a container cleaning machine for carrying out this method.

Field of the Invention

With container cleaning machines, e.g. bottle cleaning machines, having a soaking and washing solution bath which includes one or more baths, it is customary ahead of the soaking and washing solution bath to arrange a preliminary soaking tank which contains water and into which flows the used spray water from the spraying zones which follow the soaking and washing solution bath, and which leaves the preliminary soaking tank as waste water. This waste water is heavily loaded with harmful materials which essentially pass into the preliminary soaking tank with the containers, e.g. bottles, which are to be cleaned, as well as with the used spray water which flows out of the spray section. The residue of beverages and loose dirt particles which adhere to the walls of the bottles are carried in with the bottles which pass through the preliminary soaking tank. Wash chemicals which are carried along, and dirt particles of all types, pass into the preliminary soaking tank with the used spray water from the soaking and washing solution bath. The thus formed quantity of harmful material, essentially comprises materials which can be deposited and oxidized; thus, depending upon how dirty the bottles are, such harmful materials are present in the waste water in such a concentration that this waste water, for example if directly introduced into a stream or other body of water, leads to considerable, and often undue, environmental pollution. Furthermore, depending on the harmfulness and pollution of the waste water, statutorially set fees may have to be paid, which puts a heavy finanical burden on the bottling operation.

DESCRIPTION OF THE PRIOR ART

It is already known from the bottle cleaning machines of German Offenlegungsschrift No. 29 43 110 Ruppell of May 5, 1981 to supply the waste water flowing out of the preliminary soaking tank to a filtering or cleaning container prior to supplying it to a heat exchanger; such a filtering or cleaning container serves chiefly to handle coarse material, and is intended apparently only to assure the function of the heat exchanger with a view toward the heat exchanger which is to be effected.

SUMMARY OF THE INVENTION

It is an object of the present invention to provide a simple and economical method and container cleaning machine in order to reduce the quantity of harmful materials which up to now have been carried off from the container cleaning machine by the waste water of the preliminary soaking tank to such an extent that this quantity of harmful material does not exceed the quantity of harmful material carried along by the used spray water of a respective spraying section, and fulfills the conditions for direct or indirect introduction of the waste water.

BRIEF DESCRIPTION OF THE DRAWINGS

This object, and other objects and advantages of the present invention, will appear more clearly from the following specification in connection with the accompanying drawings, in which.

DETAILED DESCRIPTION

Figure 1:
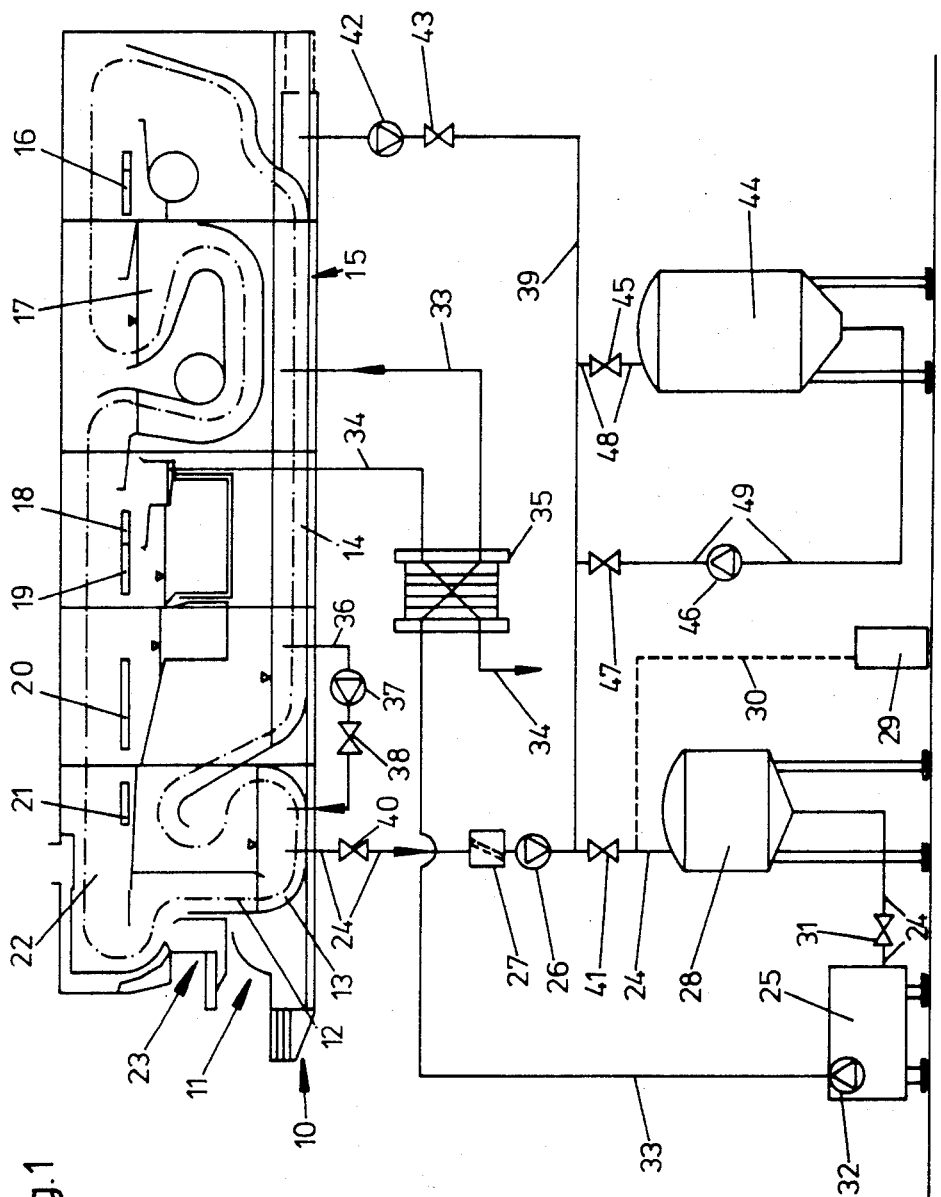
FIG. 1 shows one embodiment of an inventive container cleaning machine having a preliminary soaking tank of one bath.

The method of the present invention is characterized primarily in that soaking solution is used as bath solution for the preliminary soaking tank; in that at least a partial flow of the soaking solution from the preliminary soaking tank is cleaned and is returned to a soaking bath of comparable wash solution concentration for further treatment of the containers while taking into account bath solution levels which are to be maintained, and during sufficient regeneration of the wash solution; and in that the used spray water from the spray sections is drained off from the machine while bypassing the preliminary soaking tank.

Pursuant to further proposals of the present invention, during the operation of the machine the partial flow can be continuously withdrawn and cleaned, and the cleaned partial flow can be returned to that soaking bath of the soaking and washing solution bath which, when viewed in the direction in which the containers are being transported, follows the preliminary soaking tank. A quantity of bath solution which corresponds to the cleaned partial flow and which includes the amount carried along can be withdrawn from the soaking bath and can be supplied to the preliminary soaking tank.

The cleaned partial flow may be returned to the preliminary soaking tank, and the missing amount can be replenished at a comparable wash solution concentration from the soaking bath of the soaking and washing solution bath. In order to effect an adequate wash solution regeneration of the soaking and washing solution bath, a partial quantity of bath solution can be withdrawn from the soaking bath, cleaned, and returned to the soaking bath. The partial flow removed from the preliminary soaking tank, and the partial quantity removed from the soaking bath, at predetermined time intervals, can be alternately supplied to a common wash solution cleaning device. If the container cleaning machine is provided with a preliminary soaking tank which is divided into at least two baths which, when viewed in the direction in which the containers are transported, are arranged one after the other, then the partial flow which is to be cleaned may be removed from the first bath when viewed in the direction of transport, and the cleaned partial flow may be returned to the last bath when viewed in the direction of transport.

The cleaned partial flow may be returned to that soaking bath of the soaking and washing solution bath which has the lower wash solution concentration, and a quantity of bath solution which corresponds to the cleaned partial flow may be removed from this last mentioned soaking bath and may be supplied to the preliminary soaking tank.

Heat from the used spray water may be supplied to the cleaned partial flow prior to the return of the latter into the preliminary soaking tank or the soaking bath.

Not only the partial flow removed from the preliminary soaking tank, but also the partial quantity removed from the soaking and washing solution bath, may be supplied to a wash solution cleaning device which is suitable at least for separating out those materials which can be deposited and oxidized. For effecting this separation, the partial flow and the partial quantity may be treated with a coagulant. The partial flow and the partial quantity may be crudely cleaned to prepare them for the treatment with the coagulant.

The used spray water may be withdrawn as waste water.

The used spray water may be withdrawn and prepared as usable water, and after such preparation may be supplied to the spraying zones to be used as spray water, or may be supplied to the treatment zones of another treatment machine.

The container cleaning machine for carrying out the inventive method is characterized primarily in that the preliminary soaking tank is designed for receiving soaking solution as bath solution and is connected to a wash solution cleaning device for the removal of material which can be deposited and oxidized; in that the wash solution cleaning device is connected via a return conduit with a soaking bath which has a comparable wash solution concentration, and is provided with a compensation conduit which connects the preliminary soaking tank and the soaking bath; and in that the withdrawal for the used spray water from the spraying stations is designed as a waste water line which bypasses the preliminary soaking tank.

Pursuant to further features of the inventive container cleaning machine, the return conduit of the wash solution cleaning device may be connected to the soaking bath of the soaking and washing solution bath. The preliminary soaking tank may be designed as a double preliminary soaking tank, the wash solution cleaning device may be connected to the first bath when viewed in the direction of transport, and the compensation conduit, accompanied by the interposition of a shut-off device and a pump, may be connected to the second bath when viewed in the direction of transport.

The primary side of a heat exchanger may be interposed in the return conduit, and the secondary side of the heat exchanger may be interposed in the waste water line. The wash solution cleaning device may comprise a suction band filter with which, in the supply line which is connected to the preliminary soaking tank, there is associated a plate filter and a reaction container ahead of which there is arranged a dosing device. A connecting conduit, which leads from the rear bath region of the soaking bath and in which is interposed a pump and a shut-off device, is connected to the conduit between the plate filter and the connection of the dosing device, and a shut-off device is interposed in the conduit between the preliminary soaking tank and the plate filter. A storage container which can be switched on or off is connected to the connecting line by means of conduits and interposed shut-off devices.

A shut-off device may be placed in the return conduit between the soaking bath and the heat exchanger, and a branch conduit, which leads to the preliminary soaking tank and is provided with a shut-off device, may be connected to the return conduit ahead of the first mentioned shut-off device when viewed in the direction of flow. If the preliminary soaking tank is designed as a double preliminary soaking tank, the branch conduit may be connected to the second bath.

The waste water line may be connected to the inlet of a water treatment unit, an outlet of which inturn may be connected with the spraying zones for used spray water, or may be connected to a treatment zone of another treatment machine, for example a box washer.

With the proposed inventive process, especially the problems which occur with high temperature cleaning machines with regard to the waste water are eliminated. Thus, in the least favorable situations, the waste water now only contains the harmful materials which the used spray water carries along. The quantity of these harmful materials is so slight that it is only slightly subject or not even subject at all to charges, and does not lead to pollution of the environment. Furthermore, the continuous cost for cleaning the bottles can be considerably reduced.

DESCRIPTION OF PREFERRED EMBODIMENTS

Referring now to the drawings in detail, FIG. 1 illustrates a conventional container cleaning machine 10 for bottles. With this machine 10, the bottles which are to be cleaned pass via a feeding device 11 and a machine opening which follows it into a transport device 12 which is formed of nonillustrated bottle baskets and an endless conveyor chain. By means of this transport device 12, the bottles are first guided through a preliminary soaking tank 13 which contains soaking solution, and are subsequently guided into a first soaking bath 14 of a soaking and washing solution bath 15, which soaking bath 14 has essentially the same soaking solution concentration as does the preliminary soaking tank 13. After the transport device 12 changes direction, the bottles encounter a wash solution spraying zone 16 and a second soaking bath 17 of the soaking and washing solution bath 15, which soaking bath 17 generally has a lower concentration of wash solution. The bottles also encounter a conveying section which extends above the soaking bath 14 and is provided with a plurality of tempered spraying zones 18, 19, 20, and 21. Finally, after passing through a draining zone 22, the bottles are removed from the machine by a discharge device 23. The preliminary soaking tank 13, as well as the soaking baths 14 and 17 of the soaking and washing solution bath 15, are provided with customary means for maintaining the liquid levels of the bath; and the soaking and washing solution bath 15 is provided with conventional devices for maintaining the concentration of the wash solution in the soaking baths 14 and 17.

A wash solution cleaning device, for example a suction band filter 25 for separating out the material which can be deposited and oxidized, is connected to the preliminary soaking tank 13, which comprises a single bath, by means of a conduit 24 which extends from the preliminary soaking tank 13. During the operation of the machine 10, a partial stream which is to be cleaned is continuously supplied to the filter 25. By means of a pump 26 which is interposed in the conduit 24, the partial stream is removed from the preliminary soaking tank 13 and, prior to encountering the pump 26, is crudely preliminarily filtered by means of a plate filter 27, while after the partial stream has encountered and passed the pump 26, and after a filtering aid in the form of a coagulant is added thereto, the partial stream is supplied to a reaction container 28. For adding the coagulant, for example a polyelectrolyte, a dosing device 29 is connected to the conduit 24 by means of a feed line 30. A shut-off device 31, which is provided in the conduit 24 between the reaction container 28 and the suction band filter 25, serves for adjustment of the retention time of the wash solution in the reaction container 28 in order, on the one hand, to make possible the accumulation on the coagulant of the material which is to be separated out and can be deposited and oxidized, which accumulation is to take place until the time of filtration of the wash solution, and on the other hand, if necessary, to make possible the interruption of the supply of wash solution to the suction band filter 25.

The cleaned partial stream passes with the aid of a feed pump 32 over a return conduit 33 which extends from the suction band filter 25 into one of the soaking baths of the machine, for example into the soaking bath 14 of the soaking and washing solution bath 15, which soaking bath 14 has a comparable wash solution concentration. In the return conduit 33, which connects the soaking bath 14 with the suction band filter 25, as well as in a waste water line 34 which leads from the spraying zone 18 as an intermediate spraying to the public sewer system while bypassing the preliminary soaking tank 13, there is interposed a heat exchanger 35 which withdraws heat from the used up spray water and supplies it to the cleaned partial stream; in this connection, the pH of the used up spray water is reduced, for example by means of $CO_2$, to a harmless value between 6.5 and 9 in conformity with statutory requirements; furthermore, the used up spray water is made harmless with regard to materials which can be deposited and oxidized. For the aforementioned heat transfer, the primary side of the heat exchanger 35 is interposed in the return conduit 33 and the secondary side of the heat exchanger 35 is interposed in the waste water line 34. Furthermore, the heat exchanger 35 is designed in such a way that the used up spray water, which is conveyed into the public sewer system as waste water, has a harmless temperature which conforms to the statutory minimum requirements, being for example at most 35° C.

To compensate for the quantity of bath liquid withdrawn from the preliminary soaking tank 13 in the form of the partial stream, a compensation conduit 36 is provided which connects the soaking bath 14 with the preliminary soaking tank 13. The compensation conduit 36 includes a pump 37 in the form of a centrifugal pump and a shut-off device 38 which is arranged ahead of the pump 37 when viewed in the direction of flow. The pump 37 conveys an adjustable amount of liquid to the preliminary soaking tank 13 from the soaking bath 14, with the adjustment of the quantity of liquid being effected, if necessary, by throttling the shut-off device 38. The quantity of liquid conveyed in the conduit 36 corresponds to the quantity of the uncleaned partial stream plus the quantity of liquid carried off by the transport device 12 out of the preliminary soaking tank 13 into the soaking bath 14. By means of the compensation conduit 36, the wash solution concentration which is set in the soaking bath 14 in a customary manner is essentially maintained in the preliminary soaking tank 13. Furthermore, due to the conduit connections 24, 33, and 36, a closed cycle is achieved which assures a continuous wash solution regeneration of the preliminary soaking tank 13 together with the soaking and washing solution bath 15. The quantity of the partial stream which is to be withdrawn from the preliminary soaking tank 13 and which is to be cleaned is determined and reconveyed from the soaking bath 14 over the compensation conduit 36 depending upon how high the amount of dirt or quantity of harmful material is to be in the used spraying water, i.e., in the waste water.

For better temperature gradation to the soaking bath 14, the preliminary soaking tank 13 may be designed as a double preliminary soaking tank (FIG. 2), comprising at least two baths which are arranged one after the other when viewed in the direction of transport of the machine, and are preferably two baths arranged one above the other, in particular, a first bath 50 and a second bath 51 arranged thereafter. In such a case it is desirable to connect the suction band filter 25 by means of the conduit 24 to the first bath 50, and to connect the compensation conduit 36 to the second bath 51. With this embodiment, the wash solution, which is supplied from the soaking bath 14 to the second bath 51 by means of the compensation conduit 36, passes into the warmest region of the first bath 50 when it overflows the coldest region of the bath 51, thereby transferring a portion of its heat to the transport device 12 and to the bottles found therein. In so doing, a lower bath temperature is established in the first bath 50 than in the second bath 51, so that the thermal loading of the bottles is less when entering a double preliminary soaking tank than when entering a single bath preliminary soaking tank.

If considerable harmful material is introduced into the preliminary soaking tank 13 due to the presence of very dirty bottles, then it is expedient at predetermined time intervals to interrupt the withdrawal of the partial stream from the preliminary soaking tank 13 via the conduit 24, and during the interruption to remove an already crudely preliminarily cleaned partial quantity of wash solution from the soaking bath 14 by means of a connecting conduit 39 which is connected to the back region of the soaking bath 14 and leads to the conduit 24, and to clean this partial quantity of wash solution by means of the reaction container 28 and the suction band filter 25 and thereafter return it to the soaking bath 14. For this purpose, shut-off devices 40 and 41 are respectively interposed in the conduit 24 not only between the preliminary soaking tank 13 and the plate filter 27 but also between the pump 26 and the connection to the feed line 30. The connecting conduit 39 is connected to the conduit 24 between the pump 26 and the shut-off device 41, and is provided with a pump 42 and a shut-off device 43.

To withdraw the partial quantity of wash solution out of the soaking bath 14 over the connecting conduit 39, the shut-off device 40 must first be closed and the pump 26 must be turned off. Furthermore, the shut-off device 38 for compensating for the amount which is carried over must be adjusted to a reduced throughput, the shut-off device 43 must be open, and the pump 42 must be turned on. The return of the partial quantity cleaned in the suction band filter 25 is effected over the return conduit 33 into the soaking bath 14. This closed liquid cycle, which only embraces the soaking bath 14, is to be alternately carried out at the predetermined time intervals with the closed liquid cycle which embraces the preliminary soaking tank 13 and the soaking bath 14 so that the used spray water only contains a small amount of material which can be oxidized, for example in a concentration of 250 mg/l CSB.

When it becomes necessary to clean the preliminary soaking tank 13, especially if the formation of a coating is detected, it is expedient to provide a storage tank 44 and to connect the inlet side of the ladder via a shut-off device 45 and a conduit 48 to the connecting conduit 39, and to connect the outlet side of the storage tank 44 via a pump 46, a further shut-off device 47, and a conduit 49 with the connecting conduit 39. When this storage tank 44 is used, and when the shut-off devices 31,38, 41, 43, and 47 are closed, the pump 37 is turned off, the shut-off devices 40 and 45 are opened, and the pump 26 is turned on, the wash solution withdrawn from the preliminary soaking tank 13 by means of the pump 26 is fed over the conduit 24, the connecting conduit 39, and the conduit 48. After the preliminary soaking tank 13 has been cleaned, the shut-off device 40 is closed, the shut-off device 38 is opened, and the pump 37 is turned on, and a quantity of wash solution which corresponds to the quantity diverted into the storage tank 44 is conveyed from the soaking bath 14 into the preliminary soaking tank 13, and when the original level has been obtained, the shut-off device 38 is closed and the pump 37 is turned off. With the shut-off devices 40 and 43 closed, the shut-off devices 31, 41, and 47 open, and the pumps 46 and 32 turned on, the wash solution temporarily stored in the storage tank 44 is supplied to the suction band filter 25 over the conduit 49, the connecting conduit 39, and the conduit 24. In so doing, the wash solution is first provided with the coagulant which is supplied via the feed line 30, and, to allow the coagulant to become effective, is conducted for the required retention time into the reaction container 28; the cleaned wash solution then passes out of the suction band filter 25 and into the soaking bath 14 by means of the pump 32 via the return conduit 33. As soon as the storage tank 44 has become empty, the shut-off device 47 is closed, the pump 46 is turned off, and the closed liquid cycle, for instance embracing the preliminary soaking tank 13 and the soaking bath 14, is established.

Naturally, the receiving capacity of the storage tank 44 can be such that, for cleaning operations which are to be carried out, the wash solution quantity which is present in the soaking bath 14 and possibly in the soaking bath 17 can also be temporarily stored. In such a case, the treatment of the temporarily stored quantity prior to return to the respective soaking bath 14 or 17 corresponds to the previously described treatment for the wash solution withdrawn from the preliminary soaking tank 13. For this temporary storage of the wash solution, for withdrawing wash solution from the soaking bath 17 a connection which can be shut-off is provided between the soaking bath 14 and the pump 42 on the connecting conduit 39, and for returning the wash solution a further connection which can be shut-off is provided from the return conduit 33 to the soaking bath 17; these connections are not illustrated.

Figure 2:
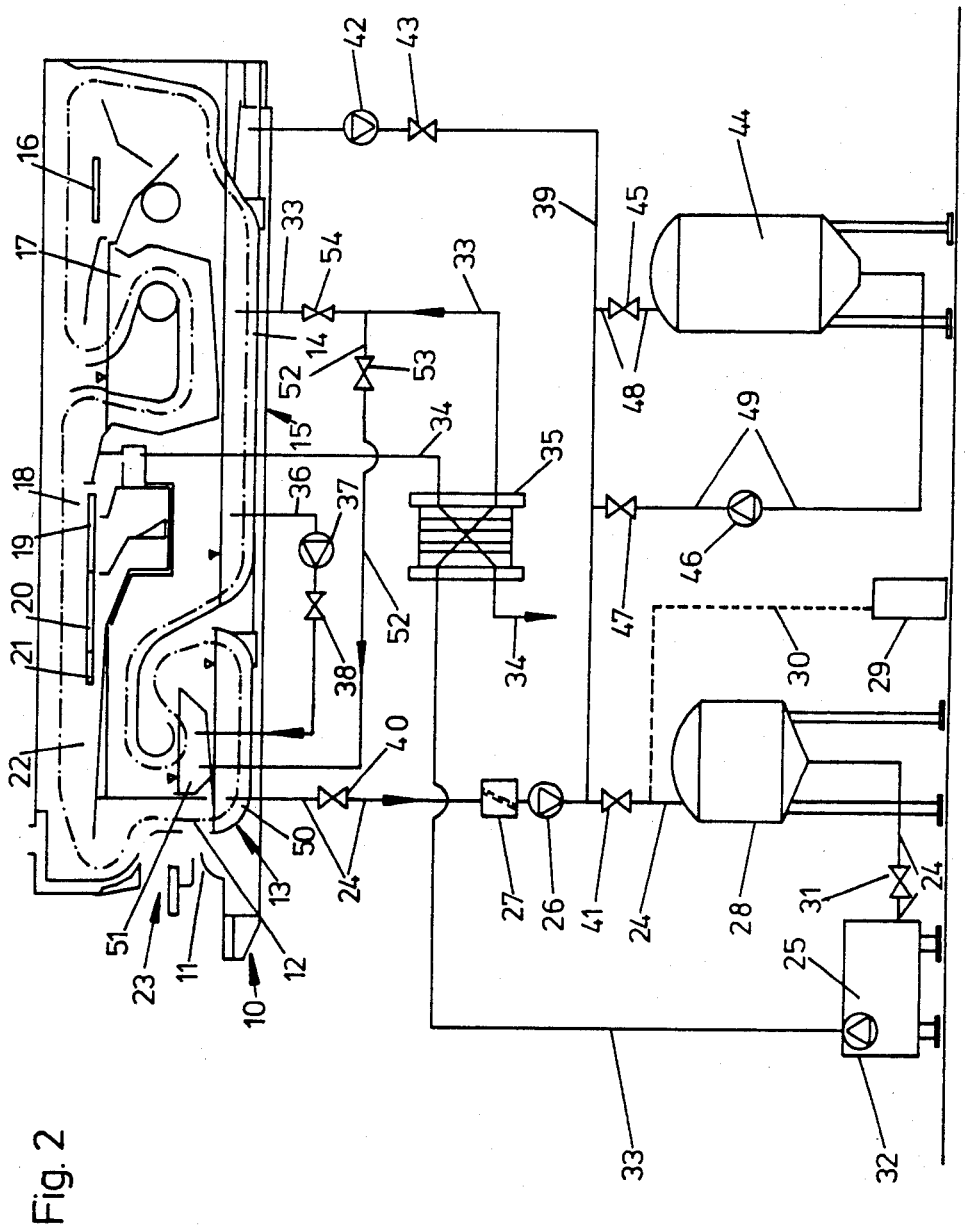
FIG. 2 shows an embodiment of an inventive container cleaning machine having a double preliminary soaking tank.

The bottle cleaning machine 10 illustrated in FIG. 2 essentially differs from that illustrated in FIG. 1 because of the double preliminary soaking tank 13 with the baths 50 and 51, with the partial stream which is removed from the first bath 50 and cleaned being supplied to the second bath 51. For this purpose, a branch conduit 51, which leads to the second bath 51 and is provided with a shut-off device 53, is provided between the heat exchanger 35 and the soaking bath 14; the branch conduit 52 is connected to the return conduit 33. Furthermore, a shut-off device 54 is interposed in the return conduit 33 between the connection of the branch conduit 52 and the soaking bath 14, so that when the shut-off device 54 is closed and the shut-off device 53 is opened, the cleaned partial flow of wash solution does not pass into the soaking bath 14, but rather passes over the branch conduit 52 into the second bath 51. If, on the other hand, the shut-off device 53 is closed and the shut-off device 54 is opened, and thereby the closed liquid cycle which embraces the soaking bath 14 is established, wash solution can be withdrawn from the soaking bath 14 by means of the pump 42 over the connecting conduit 39 and the cleaned partial flow of wash solution can be returned over the return conduit 33 into the soaking bath 14. In this connection, the compensation conduit 36 which is connected to the second soaking bath 51 serves to compensate for or replenish the quantity of wash solution which is carried out of the preliminary soaking tank 13, together with the wash solution losses out of the soaking bath 14 which result during the cleaning of the wash solution, for example during removal of the harmful materials. By the use of the branch conduit 52 and the shut-off devices 53 and 54 in conjunction with the return conduit 33, a separate closed liquid cycle for regenerating the wash solution of the double preliminary soaking tank 13 and the soaking bath 14 can be established. This results in the advantage that in addition to the favorable temperature gradation between the double preliminary soaking tank 13 and the soaking bath 14, only that quantity of wash solution which is normally carried out of the double preliminary soaking tank 13 by the transport device 12 reaches the soaking bath 14. In conjunction with the aforementioned closed liquid cycles, the double preliminary soaking tank consequently fulfills the function of heretofore utilized preliminary water soaking tanks, namely to keep undesired harmful materials out of the soaking and washing solution bath 15.

It is also within the scope of the present invention to feed the used spray water of the spraying zones 18 to 21 which collects in the intermediate spraying zone 18 to a nonillustrated water treatment unit, at the inlet of which the waste water line 34 is connected; after treatment, this water is conveyed as usable water to, for example, the intermediate spraying zone 18 or the spraying zones 19 and 20, which are designed as warm water sprayers. In so doing, a considerable savings in spray water is achieved, and the introduction of harmful material is reduced still further. The treatment zone of another treatment machine, for example a box washer, can also be connected to the outlet of the water treatment unit for utilizing the treated spray water.

In place of the common wash solution cleaning mechanism 25, 28, and 29 for the partial flow from the preliminary soak-tank 13 and the partial quantity from the soaking and washing solution bath 15, separate cleaning mechanisms can be used for the partial flow and for the partial quantity respectively.

The present invention is, of course, in no way restricted to the specific disclosure of the specification and drawings, but also encompasses any modifications within the scope of the appended claims.

What we claim is:

1. A method of reducing the amount of harmful material which could pass into waste water from a container cleaning machine which comprises a preliminary soaking tank, a subsequently arranged soaking and washing solution bath which includes at least one soaking bath, and spraying sections which are arranged after said soaking and washing solution bath; said method including the steps of:

provliding soaking solution as bath solution for said preliminary soaking tank;

diverting at least a partial flow of said soaking solution taken from said preliminary soaking tank and thereupon cleaning harmful material from such partial flow for reducing harmful materials therewith;

returning said cleaned soaking solution to either said preliminary soaking tank of said at least one soaking bath, which are of comparable wash solution concentration, for further handling of containers while observing the bath solution levels which are to be maintained, and an adequate wash solution regeneration;

withdrawing used spray water from said spraying sections, while bypassing said preliminary soaking tank, and supplying said used spray water to the waste water;

returning said cleaned partial flow to said preliminary soaking tank;

replacing missing amounts of soaking solution in said preliminary soaking tank from said at least one soaking bath of said soaking and washing solution bath, which has a comparable wash solution concentration;

effecting an adequate wash solution regeneration of said soaking and washing solution bath by removing a partial quantity of bath solution from said soaking bath, cleaning same, and returning it to said soaking bath; and at predetermined time intervals, alternately supplying to a common wash solution cleaning device said partial flow removed from said preliminary soaking tank, and said partial quantity removed from said soaking bath.

2. A method according to claim 1, which includes the steps of:

continuously, during operation of said container cleaning machine, removing said partial flow from said preliminary soaking tank and cleaning same;

returning said cleaned partial flow into that soaking bath of said soaking and washing solution bath which follows said preliminary soaking tank when viewed in the direction in which containers move through said cleaning machine; and removing from said last mentioned soaking bath, and supplying to said preliminary soaking tank, a quantity of bath solution which corresponds to the cleaned partial flow plus an amount carried off from said preliminary soaking tank by containers.

3. A method according to claim 1, which includes the steps of:

providing a preliminary soaking tank having at least two baths, which are arranged one after the other when viewed in the direction in which containers move through said cleaning machine;

removing said partial flow which is to be cleaned from the first of said baths as viewed in said direction of movement; and returning said cleaned partial flow to the last of said baths as viewed in said direction of movement.

4. A method according to claim 1, which includes the steps of:

providing a soaking and washing solution bath having a first soaking bath of comparable wash solution concentration, and a second soaking bath of lower wash solution concentration;

returning said cleaned partial flow to said second soaking bath; and supplying said preliminary soaking tank from said second soaking bath with a quantity of bath solution which corresponds to said cleaned partial flow.

5. A method according to claim 1, which includes the step of supplying heat from said used spray water to said cleaned partial flow prior to said return of the latter to either said preliminary soaking tank or said at least one soaking bath.

6. A method according to claim 1, which includes the step of supplying not only said partial flow removed from said preliminary soaking tank, but also said partial quantity removed from said soaking and washing solution bath, to a wash solution cleaning device which is suited to at least separate out material which can be deposited and oxidized.

7. A method according to claim 6, which includes the step of adding coagulant to said partial flow and said partial quantity to aid in said material separation.

8. A method according to claim 7, which includes the step of crudely cleaning said partial flow prior to adding coagulant thereto.

9. A method according to claim 1, which includes the step of withdrawing said used spray water as waste water.

10. A method according to claim 1, which includes the step of preparing said withdrawn used spray water as usable water for further use.

11. A container cleaning machine for reducing the amount of harmful material which could pass into waste water from said cleaning machine; said machine comprising:

a preliminary soaking tank which is designed to receive soaking solution as bath solution;

a subsequently arranged soaking and washing solution bath which includes at least one soaking bath;

a wash solution cleaning device connected to said preliminary soaking tank for removing and cleaning of harmful material from the wash solution, which harmful material can deposit and be oxidized, from said soaking solution thereof;

a return conduit which alternatively connects said wash solution cleaning device with either said preliminary soaking tank or said at least one soaking bath, which are of comparable wash solution concentration;

a compensation conduit which connects said preliminary soaking tank with said at least one soaking bath with which said wash solution cleaning device is connected via said return conduit;

spraying stations which are arranged after said soaking and washing solution bath;

a waste water line for withdrawing used spray water from said spraying stations, said waste water line bypassing said preliminary soaking tank;

a heat exchanger, the primary side of which is interposed in said return conduit, and the secondary side of which is interposed in said waste water line;

said wash solution cleaning device comprising a suction band filter; in which said connection of said preliminary soaking tank to said suction band filter is effected by means of a first conduit; which includes a reaction container interposed in said first conduit; which includes a plate filter interposed in said first conduit between said preliminary soaking tank and said reaction container; and which includes a dosing device associated with said first conduit between said plate filter and said reaction container; and a connecting conduit which connects that region of that soaking bath which follows said preliminary soaking tank which is remote from the latter with said first conduit between said plate filter and said association with said dosing device; which includes a shutoff device and a pump interposed in said connecting conduit; and which includes a shutoff device interposed in said first conduit between said preliminary soaking tank and said plate filter.

12. A container cleaning machine according to claim 11, in which said return conduit from said wash solution cleaning device is connected with that soaking bath of said soaking and washing solution bath which follows said preliminary soaking tank when viewed in the direction in which containers are transported through said cleaning machine.

13. A container cleaning machine according to claim 12, in which said preliminary soaking tank is a double tank comprising a first bath and a second bath arranged one after the other as viewed in said direction of transport; in which said wash solution cleaning device is connected to said first bath; in which said compensation conduit is connected to said second bath; and which includes a shutoff device and a pump interposed in said compensation conduit.

14. A container cleaning machine according to claim 11, which includes a storage tank which can be switched on or off; which includes a second conduit, in which is interposed a shut-off device, which connects said connecting conduit with an inlet side of said storage tank; and which includes a third conduit, in which is interposed a shut-off device, which connects an outlet side of said storage tank with said connecting conduit.

15. A container cleaning machine according to claim 14, in which a shut-off device is interposed in said return conduit between said soaking bath and said heat exchanger; and which includes a branch conduit, in which is interposed a shutoff device, which connects said preliminary soaking tank with said return conduit between said heat exchanger and said shut-off device interposed in said return conduit.

16. A container cleaning machine according to claim 15, in which said preliminary soaking tank is a double tank comprising a first bath and a second bath arranged one after the other as viewed in the direction in which containers are transported through said cleaning machine; in which said wash solution cleaning device is connected to said first bath; in which said compensation conduit is connected to said second bath; and in which said branch conduit is connected to said second bath.

17. A container cleaning machine according to claim 11, which includes a water treatment unit; and in which said waste water line is connected to an inlet of said water treatment unit, the latter being adapted to treat said used spray water for reuse.

* * * * *